United States Patent
Yamamoto

(10) Patent No.: US 7,673,511 B2
(45) Date of Patent: Mar. 9, 2010

(54) VIBRATION GYRO

(75) Inventor: Izumi Yamamoto, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 11/510,553

(22) Filed: Aug. 28, 2006

(65) Prior Publication Data
US 2007/0068251 A1 Mar. 29, 2007

(30) Foreign Application Priority Data
Aug. 29, 2005 (JP) ............................... 2005-247639

(51) Int. Cl.
*G01P 9/04* (2006.01)
*H01L 41/08* (2006.01)

(52) U.S. Cl. .................... 73/504.16; 310/370

(58) Field of Classification Search .............. 73/504.16, 73/504.12, 504.02, 504.04, 504.14, 504.15; 310/370
See application file for complete search history.

(56) References Cited

U.S. PATENT DOCUMENTS

| | | | | |
|---|---|---|---|---|
| 5,325,574 A | * | 7/1994 | Takagi et al. ............... | 29/25.35 |
| 5,451,828 A | | 9/1995 | Tomikawa et al. | |
| 5,533,397 A | * | 7/1996 | Sugitani et al. .......... | 73/504.16 |
| 5,691,595 A | | 11/1997 | Tomikawa et al. | |
| 6,675,651 B2 | * | 1/2004 | Yanagisawa et al. ..... | 73/504.14 |
| 7,075,218 B2 | * | 7/2006 | Matsudo et al. ............. | 310/370 |
| 7,084,556 B1 | * | 8/2006 | Dalla Piazza et al. ....... | 310/370 |
| 7,140,251 B2 | * | 11/2006 | Kawauchi et al. ......... | 73/504.16 |
| 7,193,354 B2 | * | 3/2007 | Kawashima ................ | 310/370 |
| 7,216,540 B2 | * | 5/2007 | Inoue et al. ............... | 73/504.16 |
| 7,412,886 B2 | * | 8/2008 | Dalla Piazza et al. .... | 73/504.16 |
| 7,436,107 B2 | * | 10/2008 | Aizawa et al. .............. | 310/370 |

FOREIGN PATENT DOCUMENTS

JP 2003-156337 A 5/2003

* cited by examiner

*Primary Examiner*—Helen C. Kwok
(74) *Attorney, Agent, or Firm*—Westerman, Hattori, Daniels & Adrian, LLP

(57) ABSTRACT

A vibration gyro having a high accuracy, no vibration leak, and high S/N.

The width of a detection leg of a resonator used in the vibration gyro is less than ⅗ of the width of drive legs. The length of the detection leg is larger than the length of the drive legs. As a result, the distance between the detection electrodes is decreased by comparison with the conventional vibration gyro and, therefore, the detection signal is increased and S/N is raised. Furthermore, increasing the leg length brings the natural vibration frequency of out-of-plane vibration of the drive legs close to the natural vibration frequency of the detection leg, providing good coupling and reducing vibration leak to the support section. As a result, Q is increased and S/N is accordingly further increased.

13 Claims, 13 Drawing Sheets

VIBRATION GYRO

BACKGROUND OF THE INVENTION

1. Field of the Invention

The present invention relates to a vibration gyro used for detecting an angular velocity.

2. Description of The Related Art

Vibration gyros have been used for detecting shaking, for example, in shaking prevention mechanisms of household video cameras or position detection mechanisms of car navigation systems, or for detecting a rotation speed of a vehicle body.

According to laws of physics, when viewed from a coordination system rotating at an angular velocity of $\Omega$, a Coriolis force Fc proportional to the relative velocity V of a moving physical body acts upon the physical body in the direction perpendicular to that of the velocity. The magnitude and direction of this force are represented by the following equation:

$$Fc = 2\,mV \times \Omega \qquad (1)$$

Here, m is the mass of the physical body upon which the Coriolis force acts.

A vibration gyro is an angular velocity sensor in which a resonator is caused to vibrate and a rotation is detected by determining a Coriolis force acting in the direction orthogonal to the vibration direction of the resonator due to the rotation. A variety of types such as a tuning piece type and a tuning fork type have been suggested for the resonator used in the vibration gyro.

Forces relating to two vibrations act upon the resonator of a vibration gyro: a drive vibration causing the resonator to vibrate and a detection vibration induced by a Coriolis force acting upon the resonator due to rotation.

It is preferred that neither the drive vibration nor the detection vibration of the vibration gyro be affected by the support section that supports the resonator. Furthermore, it is also preferred that the vibration gyro have a small drift and good S/N.

A vibration gyro using a resonator having three legs 5, as shown in FIG. 13 has been suggested as a vibration gyro with a small drift, good S/N and no effect from the support section (Japanese Patent Application Laid-open No. 2003-156337).

This resonator has a support section 7, a base section 3, and three legs 5. The base section 3 and the three legs 5 have substantially the same thickness. The three legs 5 have the same length and are arranged parallel to each other. The width W1 of one leg of the two side legs is substantially equal to the width W2 of the central leg and those two legs are used as drive legs 15. The width W3 of the other side leg is about 3/5 the widths W1, W2 of the two aforementioned legs, and this other leg is a detection leg 17.

The detection vibration of the resonator is performed by inducing vibrations in the drive legs 15. The drive vibration is performed by causing the two drive legs 15 to vibrate in the direction in which those two legs are arranged. Thus, both drive legs 15 are caused to vibrate in a plane formed by the two drive legs 15.

The two drive legs 15 perform flexural vibrations and repeatedly come close to each other and withdraw from one another. The two drive legs 15 perform the vibrations of the so-called tuning fork type. The two drive legs 15 have substantially equal natural vibration frequencies in the above-described in-plane vibrations. Furthermore, because the two drive legs 15 have substantially same thicknesses, lengths, and widths, the vibrations of the drive legs 15 are balanced. As a result, practically no vibration leaks to the support section 7.

Furthermore, because the width W3 of the detection leg 17 is 3/5 the widths W1, W2 of the drive legs 15, the natural vibration frequency of the detection leg is significantly different from the natural vibration frequency of the drive legs 15. For this reason, the two drive legs 15 vibrate so that the drive legs 15 are balanced, whereas the detection leg 17 is in an almost perfectly stationary state.

When this resonator is rotated, as described hereinabove, a Coriolis force is generated in the direction perpendicular to the vibration direction of the drive legs 15. Thus, a Coriolis force is generated in the direction perpendicular to the plane formed by the two drive legs 15. Under the effect of this Coriolis force, the drive legs 15 start vibrating in the direction perpendicular to this plane. In other words, the two drive legs 15 start vibrating in the out-of-plane direction. The detection leg 17 stands still when no rotation is provided. If a Coriolis force is generated in the two drive legs 15, the detection leg 17 starts vibrating in the out-of-plane direction to balance this Coriolis force. This vibration of the detection leg 17 is called "detection vibration".

The vibration amplitude of the detection leg 17 is proportional to the Coriolis force. Equation (1) shows that the Coriolis force is proportional to the angular velocity. Therefore, if the vibration of the detection leg 17 is detected, the angular velocity can be found. Because the width W3 of the detection leg 17 is 3/5 the widths W1, W2 of the drive legs 15, the movement of the two drive legs 15 and the detection leg 17 is balanced even in the out-of-plane vibrations. Therefore, the vibration leak to the support section 7 is practically zero.

In the vibration gyro using such resonator, both the drive vibration and detection vibration are accompanied by practically no vibration leak to the support section 7. For this reason, the Q of drive vibration and detection vibration is high and a large detection signal S can be obtained. Furthermore, when no rotation is provided to the resonator (stationary state), the detection leg 17 stands still, and this leg starts out-of-plane vibrations for the first time only when the rotation is provided. For this reason, noise N is low. As a result, high S/N and low drift are realized.

An increase in accuracy is required for a vibration gyro using such a resonator. The problem is that a higher S/N is necessary to obtain a high accuracy. Vibration leak has to be further reduced to obtain a higher S/N.

Accordingly, it is an object of the present invention to provide a vibration gyro capable of realizing high S/N, without vibration leak.

SUMMARY OF THE INVENTION

In order to solve the above-described problems, the present invention in accordance with the first aspect thereof provides a vibration gyro having a resonator which comprises a base section and three legs comprising drive legs having drive electrodes and a detection leg having a detection electrode. The three legs of the resonator have substantially same thickness. They are disposed parallel to each other and joined to the base section. The width of the detection leg of the resonator is formed to be less than 3/5 of the width of the drive legs, and a length of the detection leg is formed to be greater than a length of the drive legs.

More specifically, 0.1 of the width of the drive legs is set as a lower limit for the width of the detection leg, and a ratio of the width of the detection leg to the width of the drive legs is within a range of $0.1 \leq [(\text{width of detection leg})/(\text{width of drive leg})] < 0.6$.

With such configuration, a better kinetic balance of the detection leg and drive legs can be maintained, and vibrations can be prevented from leaking into the base section. Furthermore, because the distance between the electrodes formed in the detection leg can be reduced with respect to that in the conventional configurations, the voltage induced in the electrodes by the vibrations applied to the detection leg is increased. The resultant effect is that a signal detecting the angular velocity is increased and S/N rises.

Furthermore, the drive legs include a central leg and one remaining leg. The lengths of the drive legs constituted by the plurality of legs are substantially the same.

With such configuration, the drive vibration can be balanced by vibrations of both drive legs. As a result, no leak vibration is generated. Furthermore, because the detection leg is also in a stationary state, S/N is increased.

The drive legs are caused to perform flexural vibrations in a plane perpendicular to the thickness direction of the drive legs. In a state where the drive legs perform flexural vibrations, a Coriolis force is generated when the resonator rotates. This Coriolis force generates flexural vibrations in the direction perpendicular to the plane in the resonator that performs flexural vibrations in the plane. In order to keep a balance with the flexural vibration of the drive legs in the direction perpendicular to the plane, the detection leg vibrates in the direction perpendicular to the plane. The angular velocity of rotation provided to the resonator is detected by detecting such vibration of the detection leg.

The flexural vibration of the drive leg in a plane perpendicular to the thickness direction of the drive leg will be termed hereinbelow "an in-plane vibration", and the flexural vibration in the plane perpendicular to that plane will be termed "an out-of-plane vibration".

With such configuration, the detection leg stands still as long as the drive legs perform flexural vibration in the in-plane direction due to the drive vibration. On the other hand, when the drive legs perform flexural vibrations in the out-of-plane direction under the effect of a Coriolis force caused by rotation, the detection leg starts vibrating following the flexural vibration of the drive legs. The resultant effect is that no detection is carried out when there is no rotation, and the detection is first carried out during the rotation, whereby S/N is increased.

Furthermore, a cross-section in the direction perpendicular to a longitudinal direction of the detection leg is formed to have a trapezoidal shape having chamfered portions in the in-plane direction perpendicular to the thickness direction of the drive legs.

With such configuration, the distance between the detection electrodes of the detection leg is decreased and, therefore, S/N is increased.

Furthermore, a cross-section in the direction perpendicular to a longitudinal direction of the detection leg is formed to have a convex shape having a protruding section in the in-plane direction perpendicular to the thickness direction of the drive legs.

With such configuration, the distance between the detection electrodes of the detection leg is decreased and, therefore, S/N is increased.

In the vibration gyro in accordance with the present invention, the base section and three legs are a single unit.

With such configuration, the loss of vibrations in the joining zone is eliminated and, therefore, the Q factor increases. The resultant effect is that S/N increases.

In the vibration gyro in accordance with the present invention, the resonator comprises a piezoelectric single crystal.

With such configuration, by using a piezoelectric single crystal having a high Q factor for the resonator, the Q factor of the drive vibration and detection vibration rises. The resultant effect is that S/N increases.

In the vibration gyro in accordance with the present invention, the resonator comprises a support section joined to the base section and serving to attach the base section and the three legs to a package, and at least part of the support section is joined to a pedestal provided in the package.

With such configuration, the drive vibration and detection vibration of the resonator cause no vibration leak to the package. The resultant effect is that a vibration gyro with a high Q factor and high S/N is obtained.

Furthermore, the base section and the support section are configured integrally.

With such configuration, the loss of vibrations in the joining zone is eliminated and, therefore, the Q factor increases. The resultant effect is that S/N increases.

In order to solve the above-described problems, the present invention in accordance with the second aspect thereof provides a vibration gyro having a resonator which comprises a base section and three legs comprising drive legs having drive electrodes and a detection leg having a detection electrode. The three legs of the resonator have substantially same thickness. They are disposed parallel to each other and joined to the base section. The detection leg of the resonator is formed so that a width of a distal end section thereof is larger than a width of a portion other than the distal end section, and the portion of the detection leg other than the distal end section is formed so that a width thereof is less than $\frac{3}{5}$ of the width of the drive legs.

With such configuration, a better kinetic balance of the detection leg and drive legs can be maintained, and vibrations can be prevented from leaking into the base section.

Furthermore in the vibration gyro of the second aspect, a length of the detection leg is equal to or less than a length of the drive legs. In the vibration gyro of the second aspect, the resonator comprises a support section joined to the base section and serving to attach the base section and the three legs to a package, and at least part of the support section is joined to a pedestal provided in the package.

With such configuration, a better kinetic balance of the detection leg and drive legs can be maintained, vibrations can be prevented from leaking into the base section, and the total length of the resonator can be shortened.

Characteristic features of the vibration gyros of both the first and second aspects of the present invention are in the shape including the width and length of the detection leg. The specific feature of the width of the detection leg provides for enlarged detection signal and increases S/N, and the specific feature of the length of the detection leg ensures substantially same natural vibration frequencies of the drive legs and detection leg.

In particular, in the vibration gyro of the first aspect, the width of the detection leg is less than $\frac{3}{5}$ of the width of the drive leg known from prior art, and the lower limit is preferably 0.1 the length of the drive leg. Making the length of the detection leg larger than the length of the drive leg inhibits the rise in the natural vibration frequency caused by narrowing the detection leg and makes it substantially equal to the natural vibration frequency.

In the vibration gyro of the second aspect, the width of the leg section of the drive leg other than the distal end section is less than $\frac{3}{5}$ of the width of the drive leg known from prior art. By making the width of the distal end section of the detection leg larger than the width of the aforementioned leg section restricts an increase of the natural vibration frequency caused by width reduction of the detection section and makes it substantially equal to the natural vibration frequency of the drive leg.

In accordance with the present invention, by making the natural vibration frequency of a single detection leg almost matching the natural vibration frequency of the drive legs in the out-of-plane vibration, the out-of-plane vibration induced by the Coriolis force is balanced between the drive legs and the detection leg, thereby preventing the vibration from leaking to the support section, increasing the Q of the out-of-plane vibration, and raising S/N.

DESCRIPTION OF THE PREFERRED EMBODIMENTS

First Embodiment

The vibration gyro of the first embodiment of the present invention will be described below with reference to the appended drawings. The vibration gyro of the present embodiment uses a resonator 1 shown in FIG. 1.

Figure 1:
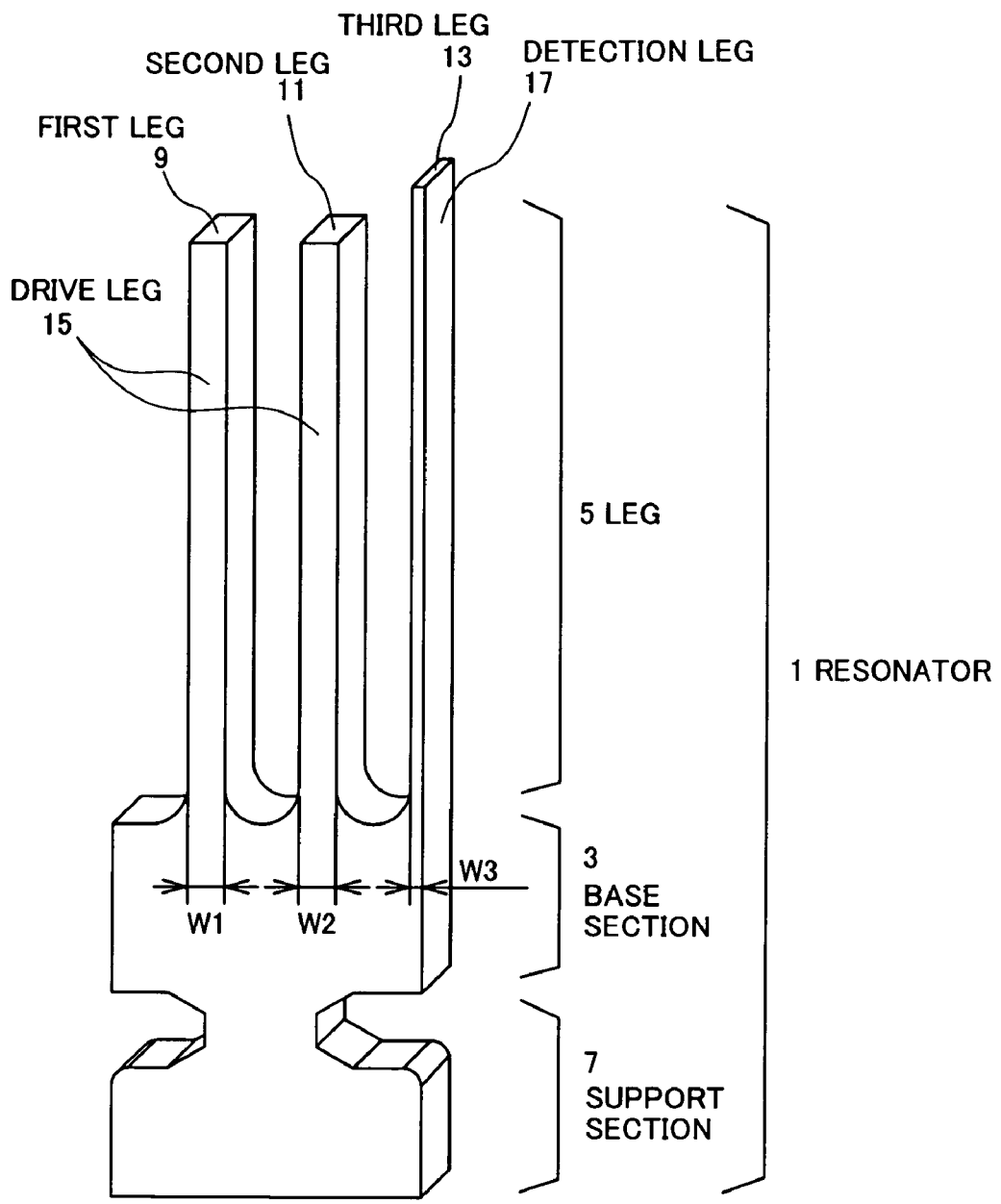
FIG. 1 is an external view of the vibration gyro of the present embodiment.
Figure 1:
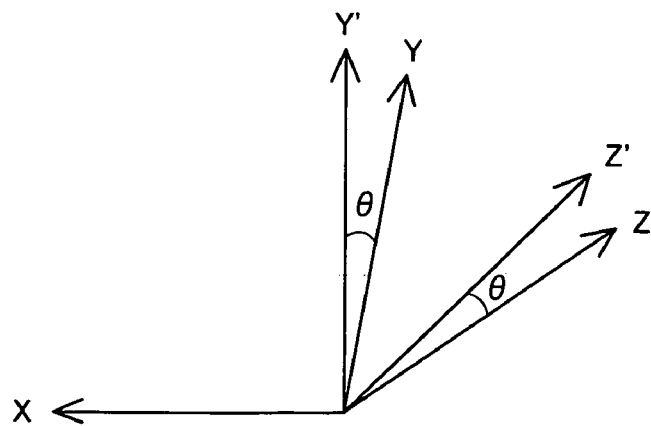

The resonator 1 shown in FIG. 1 is made from quartz and comprises a base section 3, three legs 5 extending from the base section 3, and a support section 7 extending from the base section 3 in the direction opposite that of the legs 5. The quartz is an anisotropic piezoelectric single crystal belonging to a trigonal crystal system and has as crystal axes an optical axis (Z axis), an electric axis (X axis), and a mechanical axis (Y axis) perpendicular to the optical axis and electric axis.

Where the direction parallel to the legs is taken as the X axis, and the directions obtained by rotating through an angle θ from the directions of Y axis and Z axis about the X axis as the rotation axis are taken as an Y' axis and a Z' axis, respectively, then the extension direction of the legs 5 of the resonator 1 will be the Y' axis and the thickness direction will be the Z' axis. The magnitude of the angle θ is 0 to 10 degrees, and the optimum value thereof is set by considering the temperature characteristic and vibration stability as indicators.

For the sake of convenience, the leg of the three legs that is the farthest in the +X direction will be termed a first leg 9, the central leg will be termed a second leg 11, and the leg that is the farthest in the −X direction will be termed a third leg 13.

Furthermore, unless specifically stated otherwise, the distance in the X direction will be termed "width", the distance in the Y' direction will be termed "length", and the distance in the Z' direction will be termed "thickness".

The legs 5, base section 3, and support section 7 are formed integrally, and the thickness thereof is substantially the same. The width W1 of the first leg 9 and the width W2 of the second leg 11 are substantially same. The width W3 of the third leg 13 is smaller than the width W1 of the first leg 9 and the width W2 of the second leg 11 and is less than ⅗ the width W1 of the first leg 9 and the width W2 of the second leg 11. As for the lengths of each leg, the lengths of the first leg 9 and second leg 11 are substantially same, and the third leg 13 is longer than those legs. The reasons for selecting such widths and lengths of the legs will be described below in greater detail.

The first leg 9 and second leg 11 are drive legs 15 and they perform flexural vibrations in the XY' plane.

The case where the drive legs 15 perform flexural vibrations in the XY' plane will be termed "in-plane vibration", and the case where the drive legs 15 perform flexural vibrations in the direction outside of the XY' plane will be termed "out-of-plane vibration".

When a rotation is provided about the Y' axis, a Coriolis force is generated in the Z' direction, and the leg 5 starts vibrating in the out-of-plane direction. In a drive mode, the first leg 9 and second leg 11 vibrate in the mutually opposite directions. When the first leg 9 bends in the −X direction, the second leg 11 bends in the +X direction, and when the first leg 9 bends in the +X direction, the second leg 11 bends in the −X direction.

For this reason, when the Coriolis force acts upon the first leg 9 in the +Z' direction, it acts upon the second leg 11 in the −Z' direction, and when the Coriolis force acts upon the first leg 9 in the −Z' direction, it acts upon the second leg 11 in the +Z' direction, whereby torsional vibrations are generated in the base section 3 about the point between the first leg 9 and second leg 11, but a detection leg 17, which is the third leg 13, reacts to this movement and starts vibrating in the out-of-plane direction to balance it. The angular velocity can be detected by detecting this movement.

Figure 2:
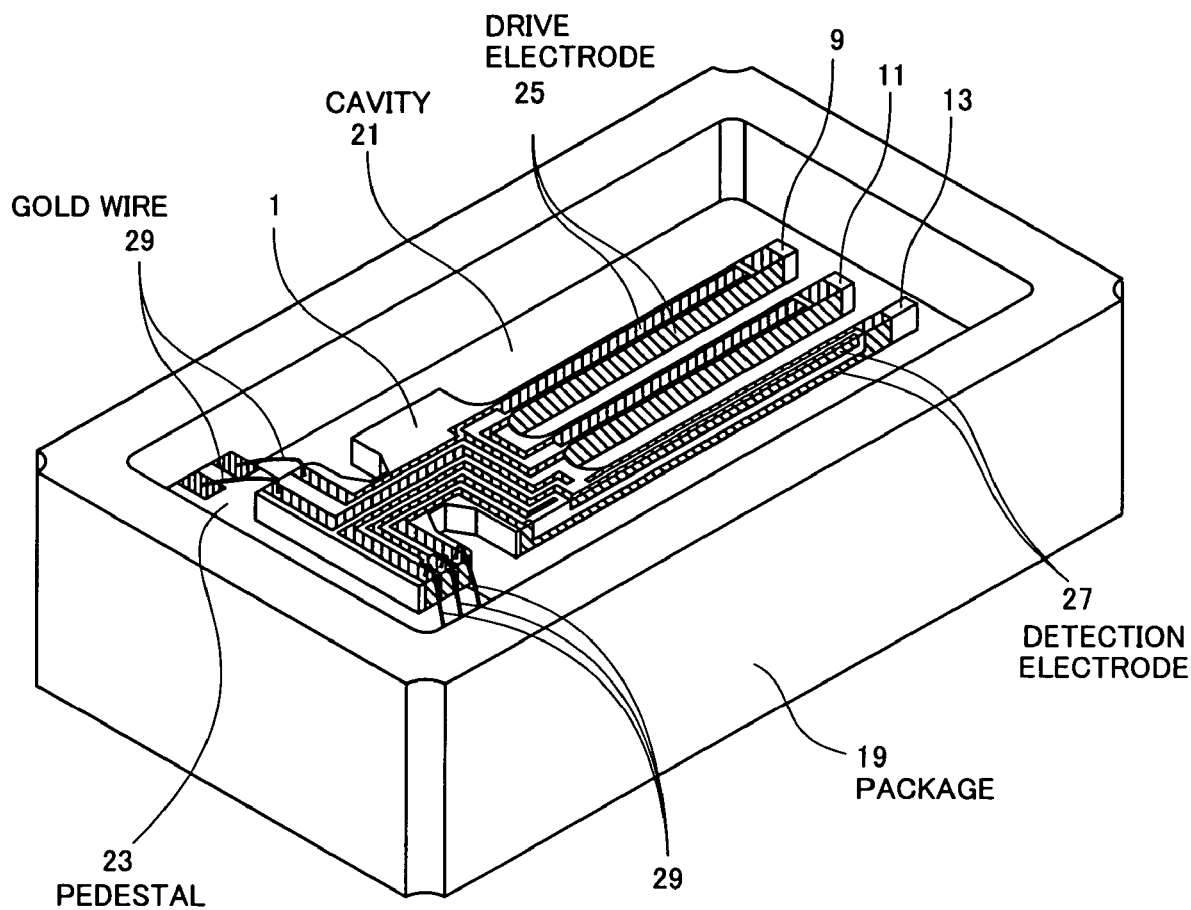
FIG. 2 shows how the resonator and a package are joined and illustrates the electrode structure of the resonator.

FIG. 2 shows how the resonator 1 and a package 19 are joined and illustrates the electrode structure of the resonator 1. The resonator 1 is joined by a portion of the support section to a pedestal 23 of the package 19 provided inside a cavity 21. Drive electrodes 25 for driving are formed at the first leg 9 and second leg 11, and a detection electrode 27 for angular velocity detection is formed at the third leg 13. Each electrode is led to the support section via the base section and electrically connected to terminals at the side of the package 19 with gold wires 29 in the support section.

The package 19 is made from a ceramic, and each terminal is led to the bottom surface via the inner side and outer side of the package 19 and electrically connected to an IC or a chip component (not shown in the figure) provided on the bottom surface. Furthermore, the cavity 21 is hermetically sealed with a lid (not shown in the figure) and the inside thereof is sometimes evacuated or filled with an inactive gas under a constant pressure.

Figure 3:
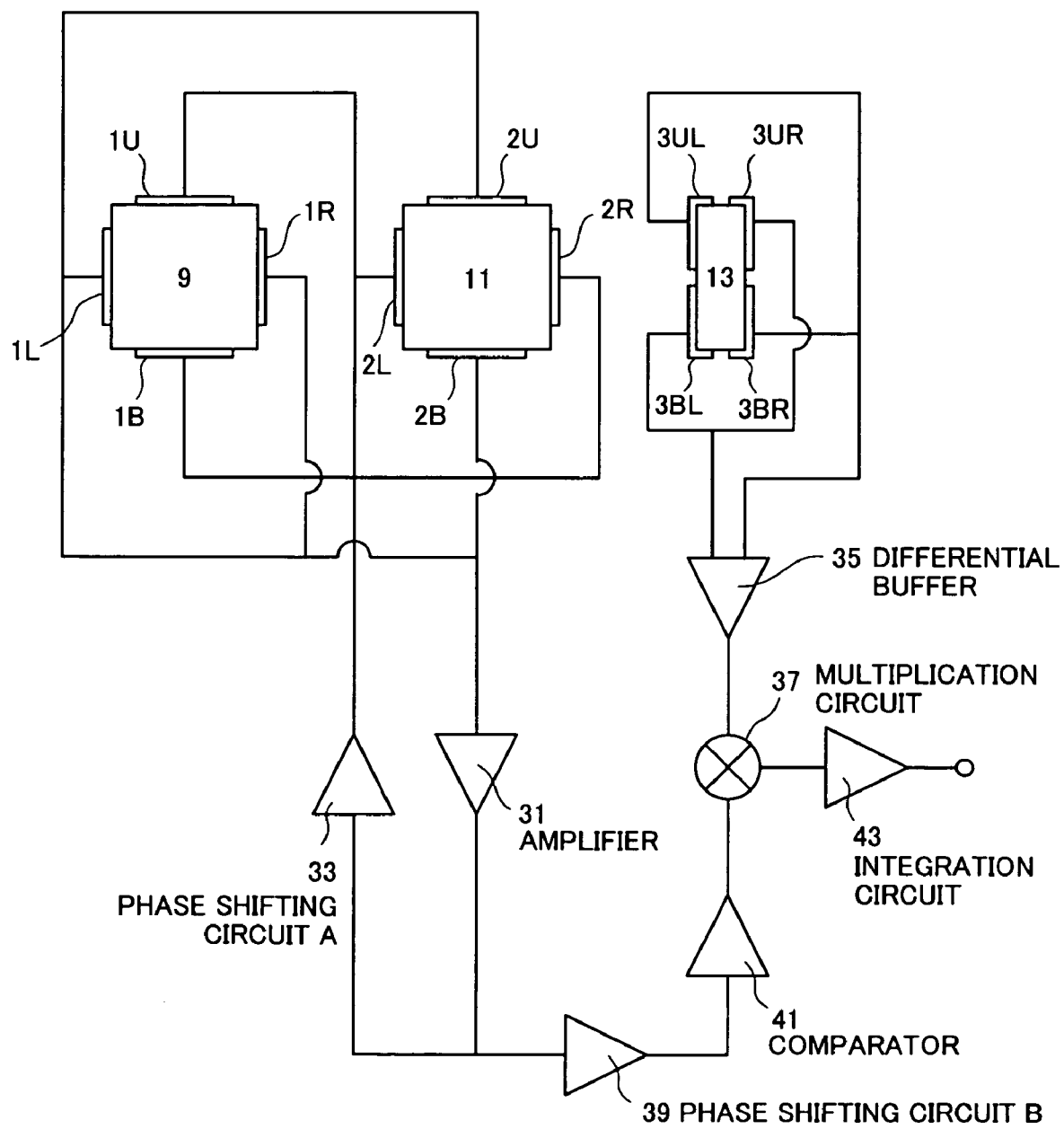
FIG. 3 is a cross-sectional view of the three legs of the resonator and shows the electrode structure of the legs.

FIG. 3 is a cross-sectional view of the three legs of the resonator and shows the electrode structure of the legs. FIG. 3 is also a circuit block diagram and a schematic diagram illustrating the wiring. Electrodes 1L, 1R located at a side surface perpendicular to the X axis of the first leg 9 and electrodes 2U, 2B located in a plane parallel to the X axis of the second leg 11 are connected to each other and are at the same electric potential.

Those electrodes are connected to an amplifier 31 and also connected via a phase shifting circuit A 33 to electrodes 1U, 1B located in a plane parallel to the X axis of the first leg 9 and electrodes 2L, 2R located in a plane perpendicular to the X axis of the second leg 11, thereby forming a self-induced vibration circuit.

When the potential of electrodes 1L, 1R, 2U, 2B is higher than that of the electrodes 1U, 1B, 2L, 2R, an electric field in the −X direction is applied to the left half of the first leg 9 and an electric field in the +X direction is applied to the right half. Furthermore, an electric field in the +X direction is applied to the left half of the second leg 11, and an electric field in the −X direction is applied to the right half.

When a voltage in the +X direction is applied and an extension stress is induced in the quartz, and also when an electric field in the −X direction is applied and a compressive stress is induced, the left half of the first leg 9 contracts and the right half extends. Therefore, the first leg 9 bends in the +X direction. In the second leg 11, the left half extends and the right half contracts. Therefore, the second leg 11 bends in the −X direction.

Conversely, when the potential of the electrodes 1L, 1R, 2U, 2B is lower than that of the electrodes 1U, 1B, 2L, 2R, the electric fields are applied in the directions opposite that described above. Therefore, the first leg 9 bends in the −X direction and the second leg 11 bends in the +X direction. Since those processes are repeated alternately, the first leg 9 and second leg 11 vibrate by bending in the mutually opposite directions in the XY' plane. This is the drive vibration.

In this case, because the widths and lengths of the first leg 9 and second leg 11 are equal and balance is kept, the drive vibration becomes a self-completing vibration in the first leg 9 and second leg 11. Furthermore, because the detection leg, which is the third leg 13, is significantly different from the first leg 9 and second leg 11 in terms of the width in the X direction, the natural vibration frequency thereof is significantly different from the frequency of the drive vibration. Therefore, the third leg is not coupled with the drive vibration and stands still.

In the case of rotation at an angular velocity Ω about the Y' axis in a self-excited mode of the drive vibration, a Coriolis force acts upon the first leg 9 and second leg 11, which are the drive legs, and the out-of-plane vibration thereof is started as described hereinabove. The third leg 13 also starts the out-of-plane vibration to be balanced therewith.

When the third leg 13 is bent, for example, in the +Z' direction, the upper half of the third leg 13 in FIG. 3 contracts and the lower half extends. Therefore, an electric field in the −X direction is generated in the upper half and an electric field in the +X direction is generated in the lower half. Conversely, when the third leg 13 is bent in the −Z' direction, the upper half of the third leg 13 in FIG. 3 extends and the lower half contracts. Therefore, an electric field in the +X direction is generated in the upper half and an electric field in the −X direction is generated in the lower half.

A voltage corresponding to this electric field is generated between the electrodes 3UL, 3BR and electrodes 3UR, 3BL of the third leg 13. Those electrodes provide input to a differential buffer 35, and the output of the differential buffer 35 is led to a multiplication circuit 37. On the other hand, the output of the amplifier 31 in the self-induced vibration circuit described hereinabove is phase shifted through about 90 degrees with a phase shifting circuit B 39, binarized with a comparator 41 and then introduced as a reference signal into the multiplication circuit 37 where it is multiplied by the output of the differential buffer 35 and detected. The output of the multiplication circuit 37 is smoothed by an integration circuit 43 and serves as a DC output.

The reason for setting the width W3 of the third leg 13 less than ⅗ of the width W1 of the first leg 9 and the width W2 of the second leg 11 and setting the length of the third leg 13 larger than the length of the first leg 9 and second leg 11 will be described below.

As described hereinabove, when an angular velocity is provided about the Y' axis and a Coriolis force acts, the third leg 13 starts out-of-plane vibration, a voltage corresponding thereto is generated between the electrodes 3UL, 3BR and electrodes 3UR, 3BL, and this voltage serves as a detection signal. A high electrical/mechanical conversion coefficient may be set to increase the detection signal and rise S/N, and for this purpose a CI factor (crystal impedance or equivalent serial resistance) between the detection electrodes in the detection vibration may be decreased.

Figure 4:
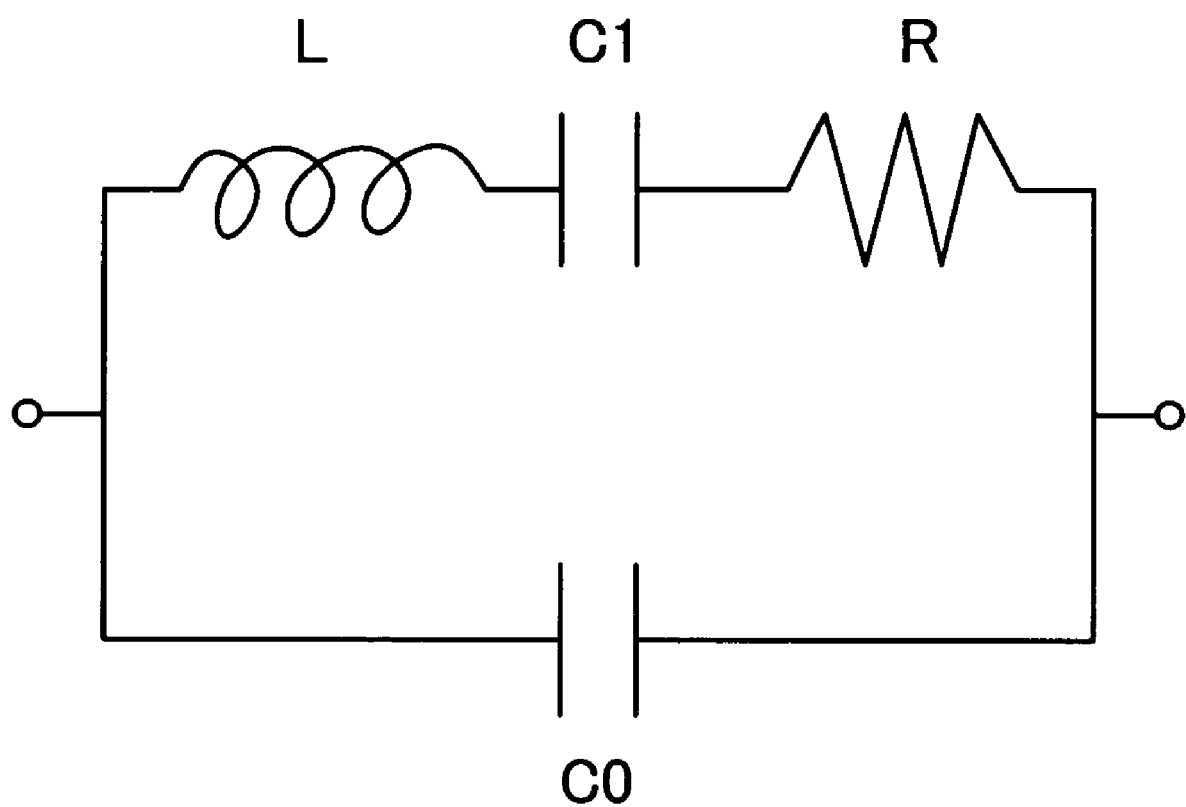
FIG. 4 shows an equivalent circuit of the resonator.

An equivalent circuit of a resonator is generally known to be represented by four element equivalent circuit constants L, C1, R, C0 shown in FIG. 4. The CI factor is equivalent to R. The relationship between the CI factor and equivalent circuit constants is represented by the following formula:

$$CI = 1/(C1 \cdot 2\pi f \cdot Q) \tag{2}$$

where f stands for a resonance frequency of the resonator. Therefore, provided that Q is constant, C1 may be increased to decrease the CI factor.

Figure 5:
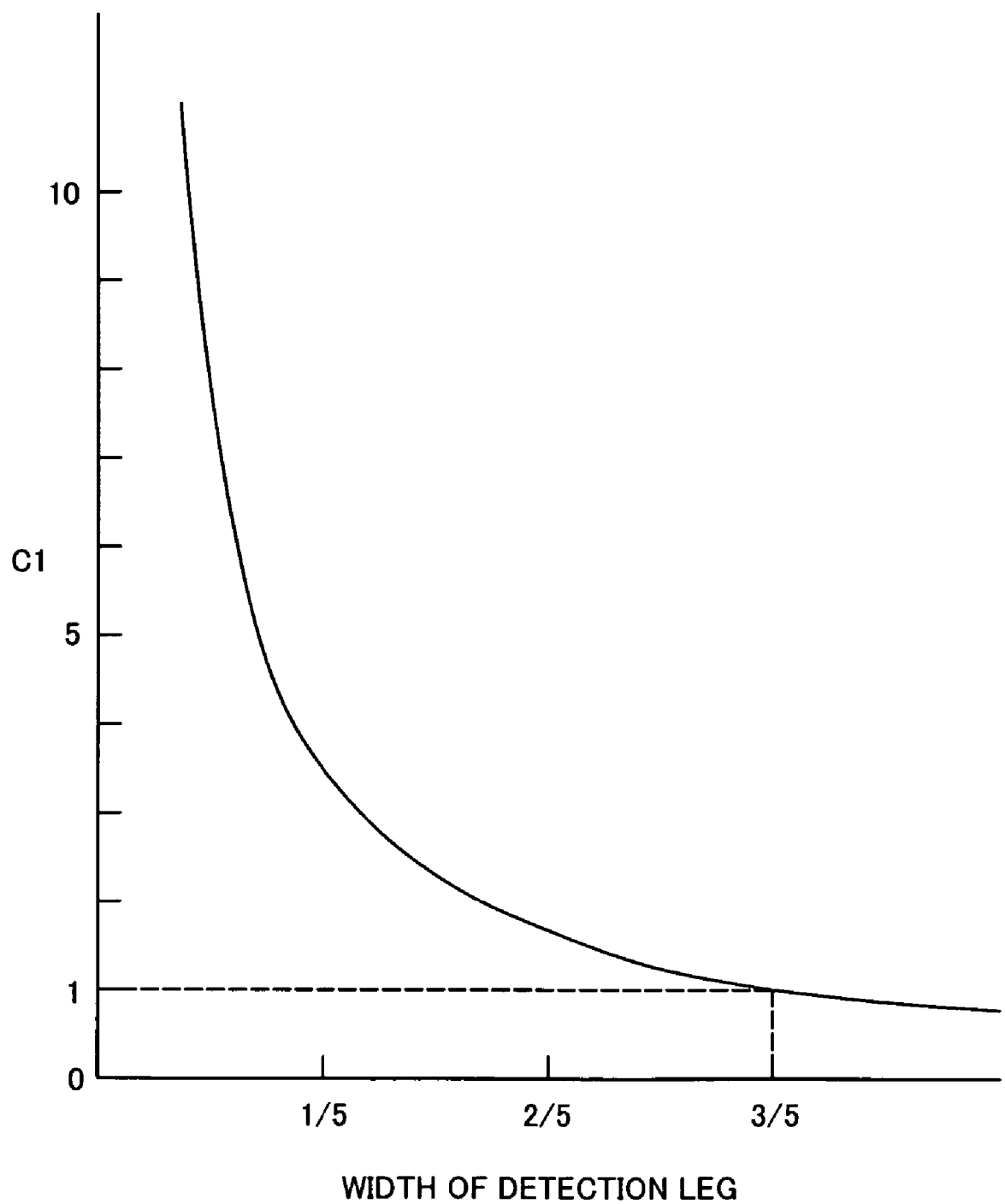
FIG. 5 shows experimental results with a decreased detection leg width.

As follows from the equivalent circuit shown in FIG. 4, because C1 is a serial capacitance between the electrodes, it increases when the distance between the electrodes is decreased. Employing this result with respect to the third leg 13, that is, the detection leg, the leg width W3 may be decreased. Accordingly, several samples with a decreased leg width were produced and tested; the results obtained are shown in FIG. 5. The leg width W3 of the third leg 13, which is the detection leg, is plotted against the abscissa by taking the leg widths W1, W2 of the first leg 9 and second leg 11 as 1. The value of C1 between the detection electrodes is plotted against the ordinate by taking the value at a leg width of ⅗ as a reference value 1.

This figure demonstrates that C1 increases when the leg width W3 is made less than ⅗, which is the conventional leg width. Furthermore, it is clear that the variation of C1 vs. the variation of the leg width increases with the decrease in the leg width.

Figure 6:
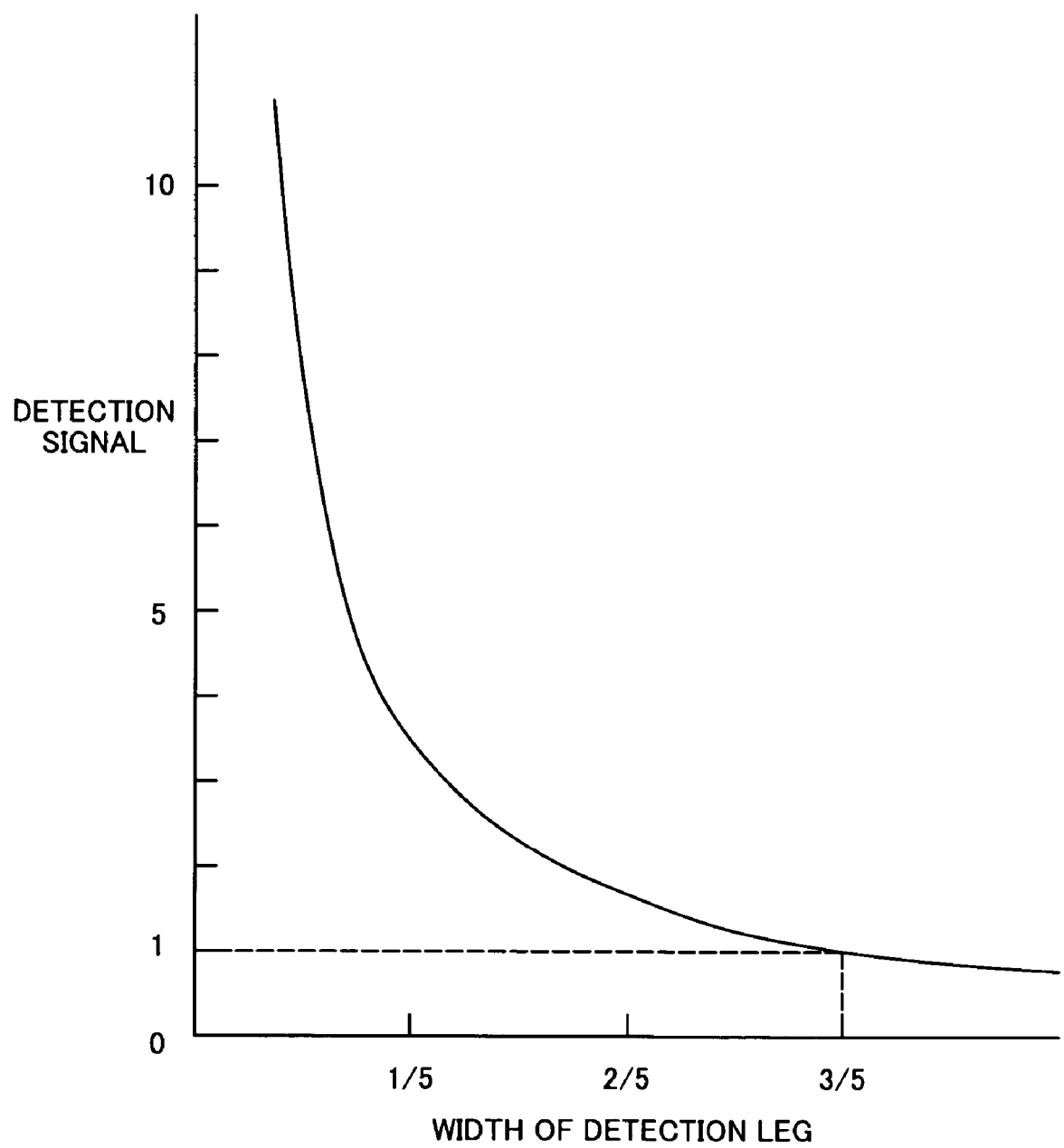
FIG. 6 shows the relationship between the leg width W3 of the detection leg and the value of the detection signal at a constant angular velocity.

The experimentally obtained relationship between the leg width W3 of the detection leg and the value of the detection signal at a constant angular velocity is shown in FIG. 6. The leg width W3 of the third leg 13, which is the detection leg, is plotted against the abscissa by taking the leg widths W1, W2 of the first leg 9 and second leg 11 as 1. The value of the detection signal is plotted against the ordinate by taking the value at a leg width of ⅗ as a reference value 1. It is clear that the detection signal increases with the decrease in leg width W3.

Furthermore, it is clear that the variation of the detection signal vs. the variation of the leg width increases with the decrease in the leg width. Due to a spread in the leg width associated with production accuracy, when the leg width is too small, the spread of the detection signal increases. For this reason there is an optimum value of the leg width. The production accuracy differs from one production line to another, but the width W3 of the detection leg is generally preferred to have 0.1 as a lower limit. In order to gain improvement over the prior art, the upper limit is preferably set to ⅗.

Figure 7:
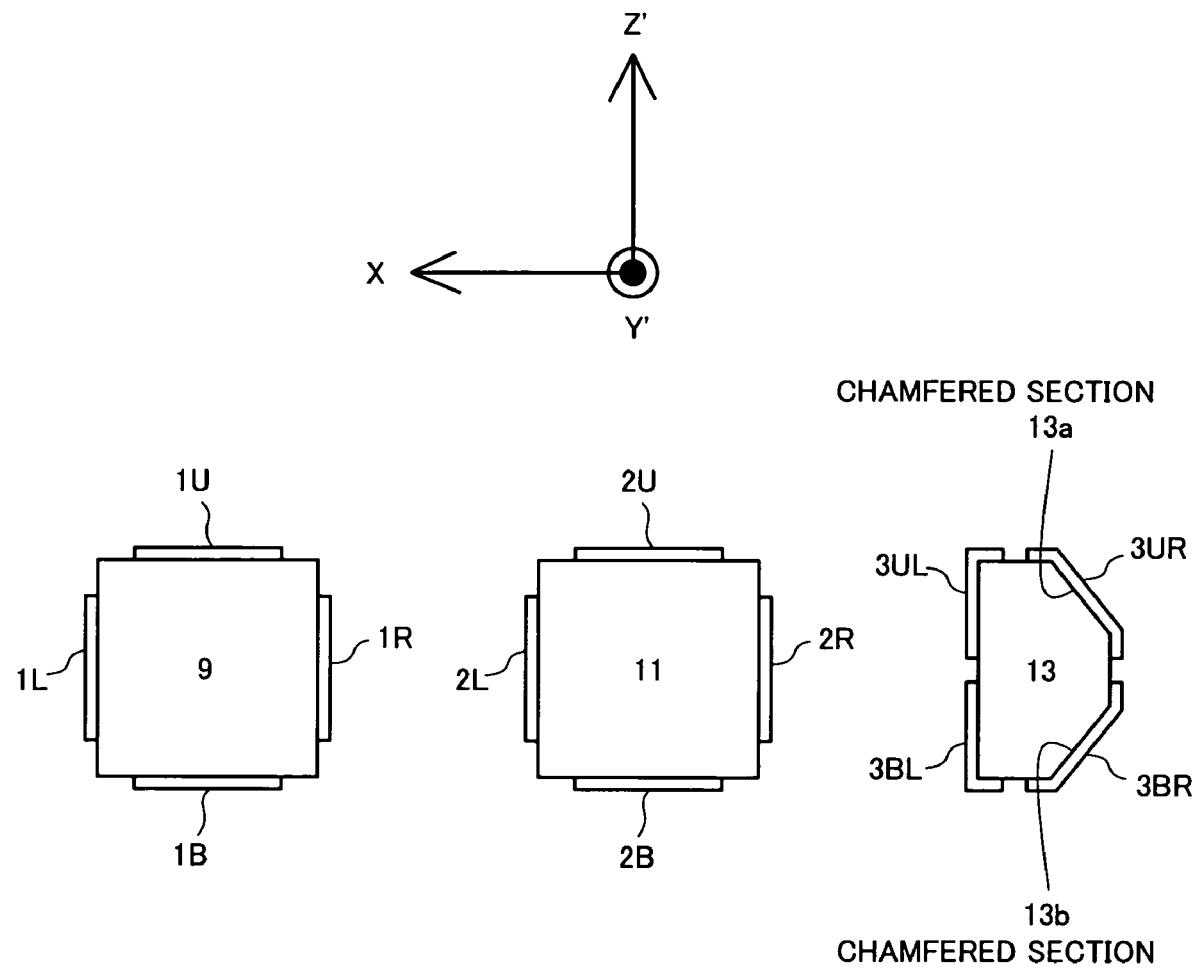
FIG. 7 shows the cross-section of legs.
Figure 8:
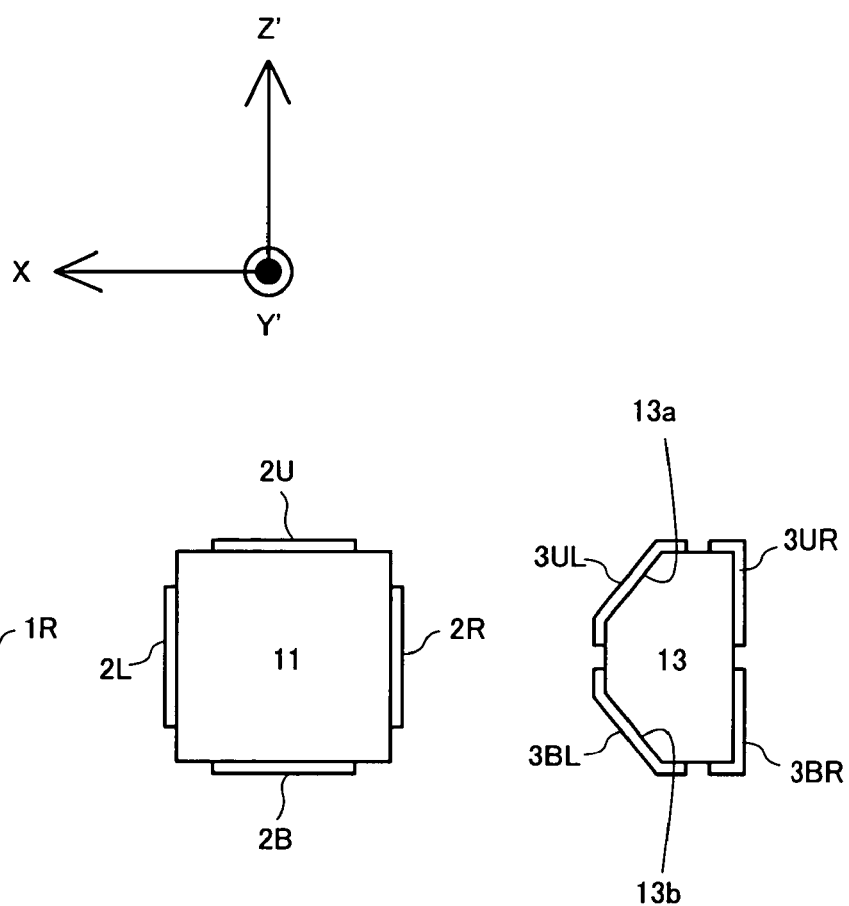
FIG. 8 shows the cross-section of legs.
Figure 9:
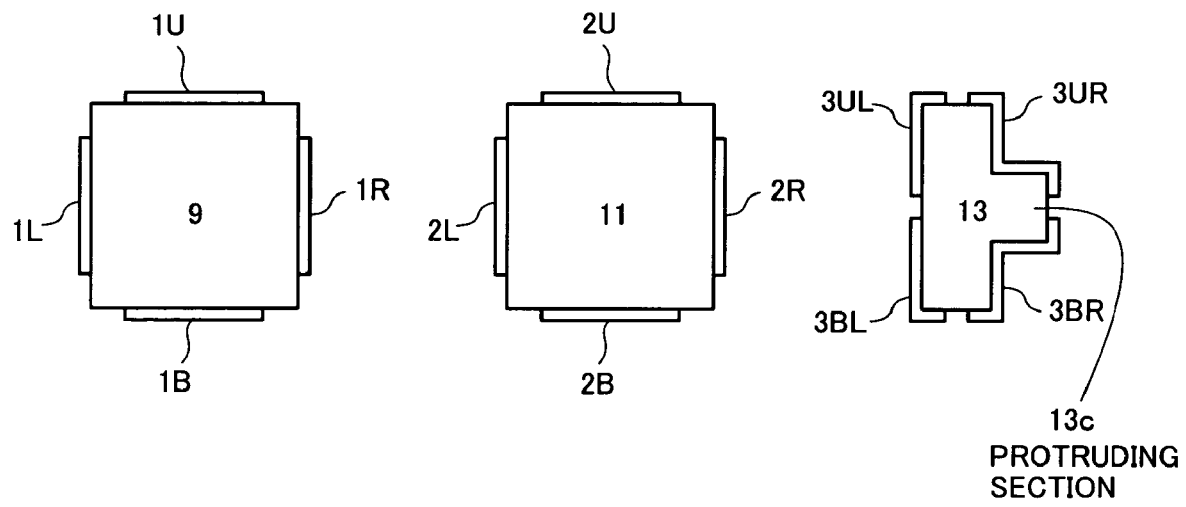
FIG. 9 shows the cross-section of legs.
Figure 10:
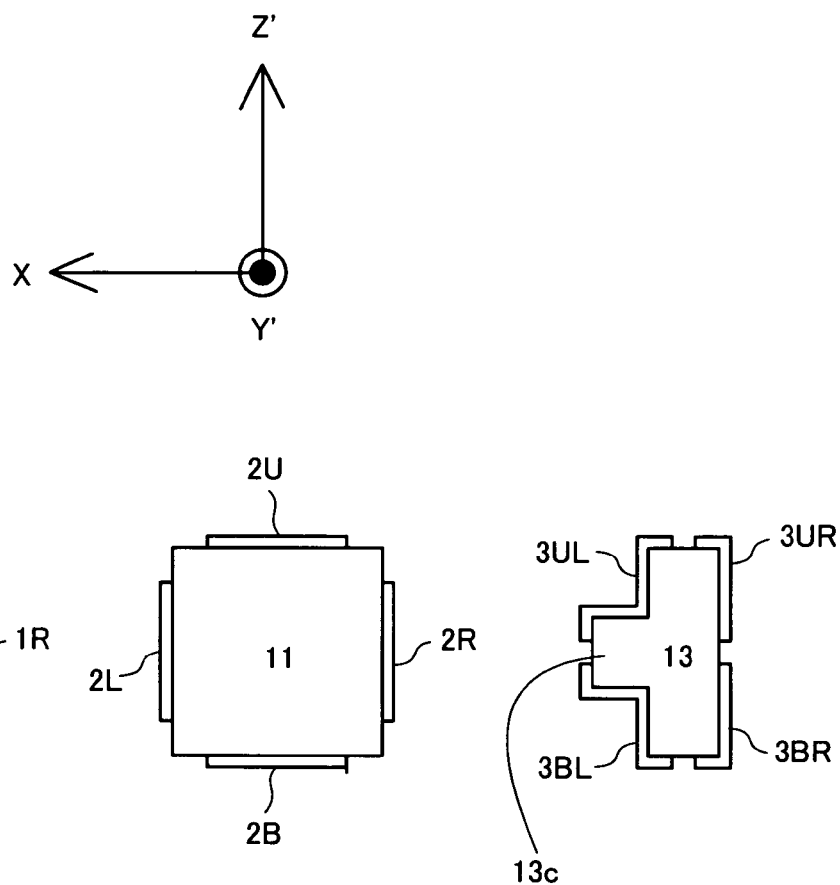
FIG. 10 shows the cross-section of legs.

Because the increase in the detection signal caused by the width reduction of the detection leg results from the decrease in the distance between the detection electrodes, the same effect can be also obtained by reducing the distance between the electrodes by providing the cross-section of the third leg 13 that is perpendicular to the longitudinal direction with a trapezoidal shape such as shown in FIG. 7 and FIG. 8 or with a convex shape such as shown in FIG. 9 and FIG. 10.

The cross-section of the third leg 13 shown in FIG. 7 is formed to have a trapezoidal shape comprising chamfered sections 13a, 13b (portions where the electrodes 3UR, 3BR were formed) in the direction of the in-plane vibration (X direction) perpendicular to the thickness direction of the first leg 9 and second leg 11. Furthermore, the cross-section of the third leg 13 shown in FIG. 8 is formed to have a trapezoidal shape comprising chamfered sections 13a, 13b (portions where the electrodes 3UL, 3BL were formed) in the direction of the in-plane vibration (X direction) perpendicular to the thickness direction of the first leg 9 and second leg 11.

The cross-section of the third leg 13 shown in FIG. 9 is formed to have a convex shape comprising a protruding section 13c (portion formed between the electrodes 3UR and 3BR) in the direction of the in-plane vibration (X direction) perpendicular to the thickness direction of the first leg 9 and second leg 11. The cross-section of the third leg 13 shown in FIG. 10 is formed to have a convex shape comprising a protruding section 13c (portion formed between the electrodes 3UL and 3BL) in the direction of the in-plane vibration (X direction) perpendicular to the thickness direction of the first leg 9 and second leg 11.

Because electrodes 1L, 1R, 2U, 2B, 1U, 1B, 2L, 2R, 3UL, 3BR, 3UR, 3BL shown in FIGS. 7 to 10 are substantially same to those shown in FIG. 3, the explanation thereof is omitted.

It was thus found that by making the third leg 13, which is the detection leg, thinner than in the conventional devices, the detection signal increases and S/N rises, but it was also found that decreasing the leg width of the third leg 13, while maintaining the length of the third leg 13 equal to the length of the first leg 9 and second leg 11, decreases the Q of the detection vibration.

This result can be explained as follows. Because the reduction in the leg width decreases the mass of the third leg 13, the natural vibration frequency of the third leg 13 in the out-of-plane vibration increases and separates itself from the natural vibration frequency of the first leg 9 and second leg 11. As a result, the coupling with the first leg 9 and second leg 11 becomes insufficient, sufficient balance with respect to the movement of the first leg 9 and second leg 11 cannot be obtained, and vibrations leak to the support section.

The variation of the natural vibration frequency of the out-of-plane vibration vs. the variation of the support method can be the indicator of the vibration leak. It can be estimated by finding experimentally the frequency difference $\Delta f$ between the case in which the support section is completely fixed and the case where it is completely free. The $\Delta f$ of about 100 ppm or less can be said to correspond to a vibration body good for a vibration gyro.

Figure 11:
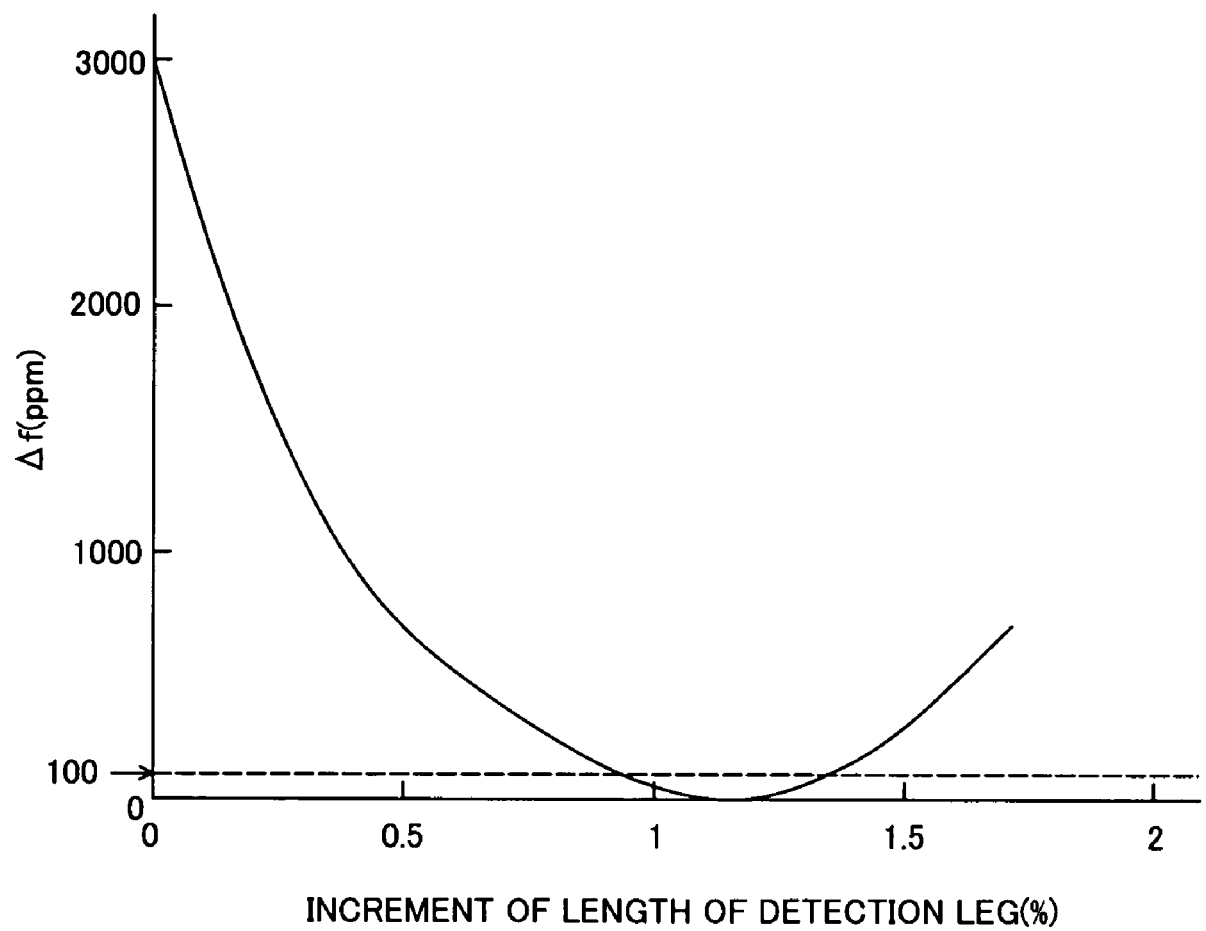
FIG. 11 shows that Δf assumes a minimum value when the detection leg length increment has a certain value.

FIG. 11 is an example of such results that were obtained by conducting a test in which the leg width W3 of the third leg 13 was set to ⅓ leg widths W1, W2 of the first leg 9 and second leg 11 and the leg length was varied. The increment in the leg length of the third leg 13, which is the detection leg, was plotted against the abscissa and represented in percents with respect to the leg length of the first leg 9 and second leg 11 as a reference, and $\Delta f$ plotted against the ordinate was represented in ppm.

FIG. 11 shows that $\Delta f$ decreases with the increase in the leg length. Therefore, it is preferred that the leg length of the third leg 13 be larger than the leg length of the first leg 9 and second leg 11. Furthermore, $\Delta f$ assumes a minimum value when the detection leg length increment has a certain value (in the present case, about 1.2%). In this case, the range of 0.9% to 1.35% in which $\Delta f$ is equal to or less than 100 ppm is preferred for the value of the detection leg length increment.

Second Embodiment

Figure 12:
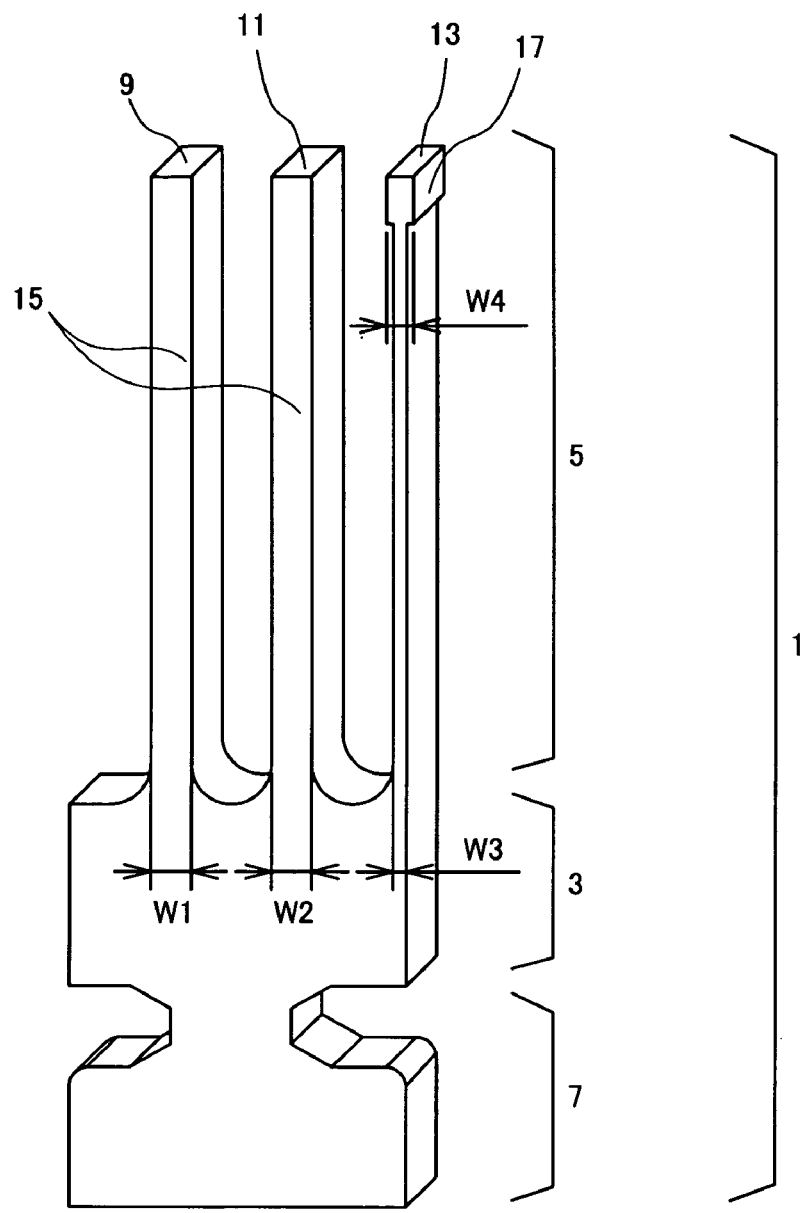
FIG. 12 shows the vibration gyro of the second present embodiment uses a resonator.
Figure 13:
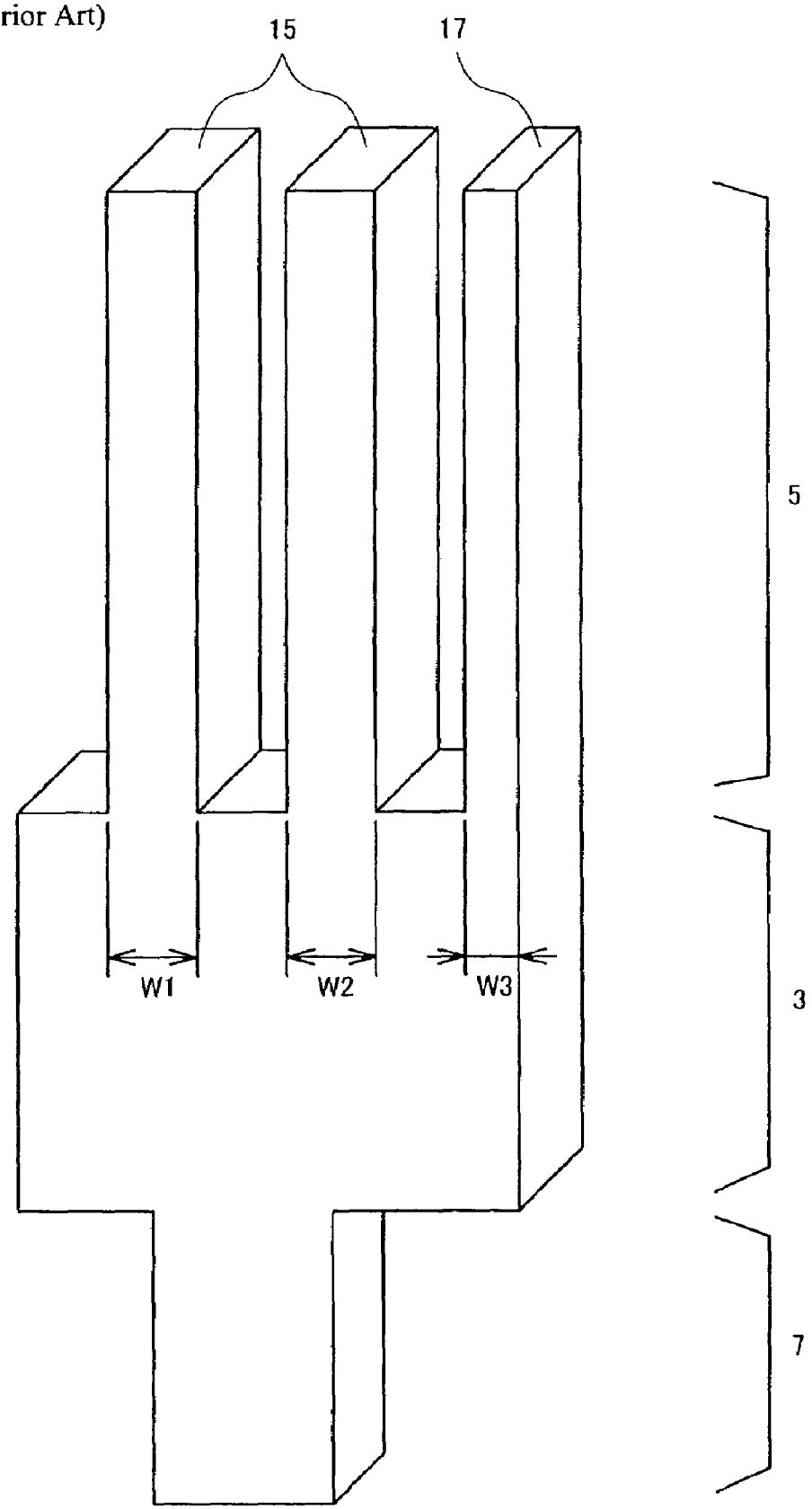
FIG. 13 shows a vibration gyro of prior art using a resonator having three legs.

The vibration gyro of the second embodiment of the present invention will be described below with reference to the appended drawings. The vibration gyro of the present embodiment uses a resonator 1 shown in FIG. 12. The resonator 1 shown in FIG. 12 is made from quartz and comprises, similarly to the resonator of the first embodiment, a base section 3, three legs 5 extending from the base section 3, and a support section 7 extending from the base section 3 in the direction opposite that of the legs 5. The quartz is an anisotropic piezoelectric single crystal belonging to a trigonal crystal system and has as crystal axis an optical axis (Z axis), an electric axis (X axis), and a mechanical axis (Y axis) perpendicular to the optical axis and electric axis.

Where the direction parallel to the legs is taken as the X axis, and the directions obtained by rotating through an angle θ from the directions of Y axis and Z axis about the X axis as the rotation axis are taken as an Y' axis and a Z' axis, respectively, then the extension direction of the legs 5 of the resonator 1 will be the Y' axis and the thickness direction will be the Z' axis. The magnitude of the angle θ is 0 to 10 degrees, and the optimum value thereof is set by considering the temperature characteristic and vibration stability as indicators.

For the sake of convenience, in the same manner as in the first embodiment, the leg of the three legs that is the farthest in the +X direction will be termed a first leg 9, the central leg will be termed a second leg 11, and the leg that is the farthest in the −X direction will be termed a third leg 13. Furthermore, unless specifically stated otherwise, the distance in the X direction will be termed "width", the distance in the Y' direction will be termed "length", and the distance in the Z' direction will be termed "thickness".

The legs 5, base section 3, and support section 7 are formed integrally, and the thickness thereof is substantially the same. The width W1 of the first leg 9 and the width W2 of the second leg 11 are substantially same. As for the width of the third leg 13, the width W3, which close to the base of the leg, is smaller than ⅗ of the width W1 of the first leg 9 and the width W2 of the second leg 11 and the width W4 of the distal end section is larger thereof. The lengths of the first leg 9 and second leg 11 are substantially same to that of the third leg 13. The reasons for selecting such a leg width of the third leg 13, which is the detection leg, will be described below in greater detail.

The first leg 9 and second leg 11 are drive legs 15 and they perform flexural vibrations in the XY' plane. When a rotation is provided thereto about the Y' axis, a Coriolis force is generated in the Z' direction, and the leg 5 starts vibrating in the out-of-plane direction. In a drive mode, the first leg 9 and second leg 11 vibrate in the mutually opposite directions. When the first leg 9 bends in the −X direction, the second leg 11 bends in the +X direction, and when the first leg 9 bends in the +X direction, the second leg 11 bends in the −X direction.

For this reason, when the Coriolis force acts upon the first leg 9 in the +Z' direction, it acts upon the second leg 11 in the −Z' direction, and when the Coriolis force acts upon the first leg 9 in the −Z' direction, it acts upon the second leg 11 in the +Z' direction, whereby torsional vibrations are generated in the base section 3 about the point between the first leg 9 and second leg 11, but a detection leg 17, which is the third leg 13, reacts to this movement and starts vibrating in the out-of-plane direction to balance it. The angular velocity can be detected by detecting this movement.

The reason for setting the width W3 in the vicinity of the leg base of the third leg 13 less than ⅗ of the widths W1, W2 of the first leg 9 and second leg 11 and setting the width W4 of the distal end section larger than those widths will be described below.

As was described in the first embodiment, by making the leg width less than ⅗, the CI factor between the detection electrodes is decreased, the detection signal is increased and S/N is raised, but the undesirable consequence of decreasing the width of the entire third leg 13, which is the detection leg, is that Q of the detection vibration decreases.

This result can be explained as follows. When the leg thickness is decreased, the mass of the third leg 13 decreases. Therefore, the natural vibration frequency of the third leg 13 in the out-of-plane vibration increases and separates itself from the natural vibration frequency of the first leg 9 and second leg 11. As a result, coupling with the first leg 9 and second leg 11 becomes insufficient, insufficient balance is attained with the movement of the first leg 9 and second leg 11, and vibration leakage occurs to the support section.

As a means for resolving this problem, the first embodiment indicated the decrease in the natural vibration frequency by increasing the leg length of the third leg 13, which is the detection leg, but in the present embodiment, the natural vibration frequency was decreased by the effect of adding weight to the distal end section by increasing the width W4 in the distal end section. As a result, the leak of vibration to the support section in the detection vibration could be eliminated.

In the present embodiment, the length of the third leg 13, which is the detection leg, was substantially equal to the length of the first leg 9 and second leg 11, which are the drive legs, but it is important that the natural vibration frequency in the out-of-plane vibration of the third leg 13 be made substantially equal to the natural vibration frequency of the first leg 9 and second leg 11 by enlarging the width W4 of the distal end section of the third leg 13 with respect to the width of other portions (width W3), and the third leg 13 can be made shorter or longer than the first leg 9 and second leg 11 by changing the width and length of the distal end section.

In the first and second embodiments, an example was explained in which quartz was used as the material of the resonator, but it is obvious that the same effect can be also obtained by using other piezoelectric single crystals, for example, lithium niobate, lithium tantalate, langasite, and piezoelectric ceramics such as PZT.

What is claimed is:

1. A vibration gyro, comprising:
a resonator which comprises a base section and three legs comprising two drive legs having drive electrodes and a single detection leg having a detection electrode, said three legs having substantially same thickness, said base section being joined to said three legs, and said three legs being disposed parallel to each other to make a vibration plane, and said two drive legs lay adjacently,
wherein a width of said single detection leg is formed to be less than ⅗ of a width of said drive legs, and a length of said single detection leg is formed to be greater than respective lengths of said two drive legs to make a natural vibration frequency of said single detection leg in an out-of-plane vibration almost match a natural vibration frequency of said two drive legs in an out-of-plane vibration.

2. The vibration gyro according to claim 1, wherein a ratio of the width of said detection leg to the width of said drive legs has 0.1 as a lower limit.

3. The vibration gyro according to claim 1 or 2, wherein said drive legs include a central leg and one remaining leg, and the lengths of the drive legs are substantially the same.

4. The vibration gyro according to claim 1 or 2, wherein by causing said drive legs to perform in-plane vibrations in a plane perpendicular to a thickness direction of said resonator and detecting a vibration of the detection leg accompanying an out-of-plane vibration in a direction perpendicular to said plane in which said in-plane vibrations are induced in said resonator, said out-of plane vibration being induced by a Coriolis force generated by rotation of said resonator, an angular velocity of said rotation is detected.

5. The vibration gyro according to claim 1 or 2, wherein a cross-section perpendicular to a longitudinal direction of said detection leg is formed to have a trapezoidal shape having chamfered portions in an in-plane direction perpendicular to the thickness direction of said drive legs.

6. The vibration gyro according to claim 1 or 2, wherein a cross-section perpendicular to a longitudinal direction of said detection leg is formed to have a convex shape having a protruding section in an in-plane direction perpendicular to the thickness direction of said drive legs.

7. The vibration gyro according to claim 1 or 2, wherein said base section and said three legs are a single unit.

8. The vibration gyro according to claim 1, wherein said resonator comprises a piezoelectric single crystal.

9. he vibration gyro according to claim 1, wherein said resonator comprises a support section joined to said base section and serving to attach said base section and said three legs to a package, and
at least part of the support section is joined to a pedestal provided in the package.

10. The vibration gyro according to claim 9, wherein said base section and said support section are a single unit.

11. A vibration gyro, comprising:
a resonator which comprises a base section and three legs, the three legs comprising a first drive leg having a first drive electrode, a second drive leg having a second drive electrode, and a detection leg having a detection electrode, a width of the first drive leg being a same width throughout its entire length and a width of the second drive leg being a same width throughout its entire length, the width of the first drive leg being the same as the width of the second drive leg;
said three legs having substantially same thickness, said base section being joined to said three legs, and said three legs being disposed parallel to each other, wherein said detection leg is formed so that a width of a distal end section thereof is larger than a width of a portion other than the distal end section, and a portion of said detection leg other than the distal end section is formed so that a width thereof is less than ⅗ of the uniform width of said first and second drive legs to make a natural vibration frequency of said detection leg in an out-of-plane vibration almost match a natural vibration frequency of said first and second drive legs in an out-of-plane vibration.

12. The vibration gyro according to claim 11, wherein a length of said detection leg is equal to or less than a length of said first drive leg and the length of said detection leg is equal to or less than a length of said second drive leg.

13. The vibration gyro according to claim 11, wherein said resonator comprises a support section joined to said base section and serving to attach said base section and said three legs to a package, and at least part of the support section is joined to a pedestal provided in the package.

* * * * *